June 17, 1958 R. E. WILSON 2,839,245
ANALOG DIVISION DEVICE
Filed Nov. 1, 1952
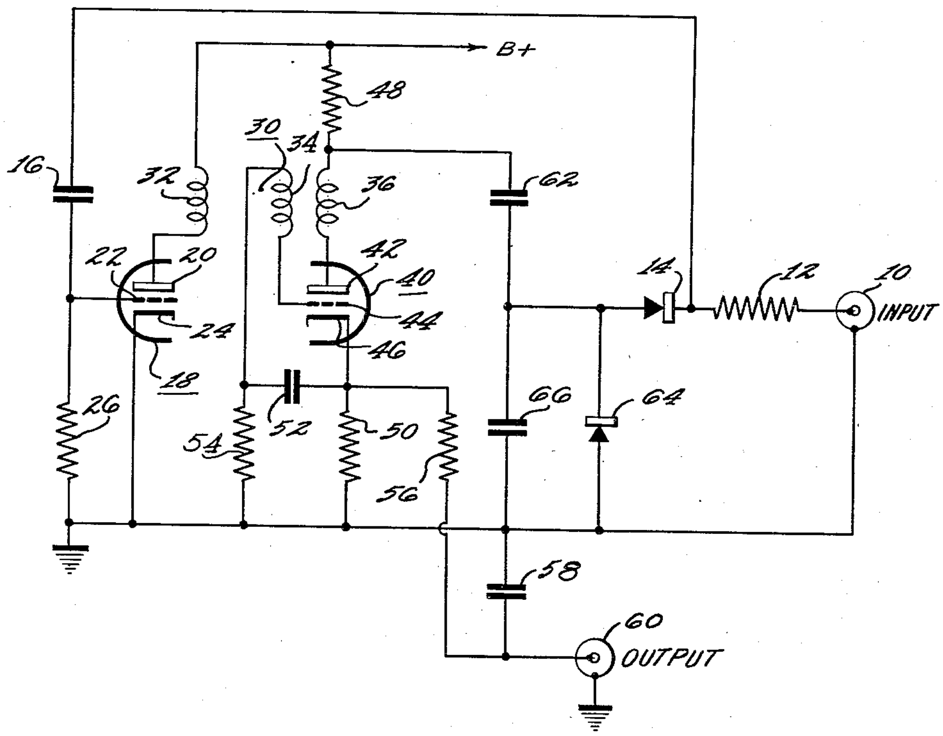
INVENTOR
Robert E. Wilson
BY Morris Rabkin
ATTORNEY

United States Patent Office 2,839,245

Patented June 17, 1958

2,839,245

ANALOG DIVISION DEVICE

Robert E. Wilson, Moorestown, N. J., assignor, by mesne assignments, to the United States of America as represented by the Secretary of the Navy Application November 1, 1952, Serial No. 318,175

11 Claims. (Cl. 235—61)

This invention relates to electrical analog computers and more particularly to an improved circuit for performing analog division.

The embodiment of the invention to be described herein performs the operation of providing at its output a voltage which is inversely proportional to the voltage applied to its input. In other words, if the input voltage is $e$, the output voltage is substantially $k/e$. This type of division finds application in analog computers wherein the solution of problems requires that the reciprocal of a voltage be provided for subsequent operation in obtaining the solution of a problem.

Another field wherein apparatus for furnishing the reciprocal of a voltage finds use is in the photographic field. In some reproducing systems a voltage representing a video signal is applied to the intensity grid of a cathode ray tube, and deflecting voltages are applied to the deflectors of a cathode ray tube so that the screen of the cathode ray tube is illuminated to produce a negative image. A photographic negative is exposed to this screen and the result after development is a picture which can be used for reproduction purposes. If it is desired to have the image on the cathode ray tube screen represent a positive, the relationships between the positive and negative signals are such that a positive is produced by using the reciprocal of the negative signal or a negative may be produced by using the reciprocal of a positive.

It is accordingly an object of the present invention to provide a novel circuit for producing a voltage which is inversely proportional to a second voltage.

A further object of the invention is to produce simple and inexpensive circuitry for performing analogue division.

These and other objects of the invention are achieved in a circuit wherein the blocking oscillator generates rectangular pulses having a frequency determined by the frequency of a voltage which is injected into the blocking oscillator. One portion of the blocking oscillator output is shaped into triangular waves. These are applied to a diode which is biased off by the voltage whose reciprocal it is desired to obtain.

The diode commences conducting at a portion on the sawtooth voltage which is determined by the amplitude of the input biasing voltage. The diode is connected through a differentiating circuit to an amplifier. The output from this amplifier is injected into the blocking oscillator to determine its frequency. Accordingly, the blocking oscillator generates pulses whose spacing or frequency is inversely related to the amplitude of the input voltage. A second output is derived from the blocking oscillator. This is integrated and provides a voltage, the amplitude of which is reciprocally related to the amplitude of the input voltage.

The novel features of the invention as well as the invention itself, both as to its organization and method of operation, will best be understood from the following description when read in connection with the accompanying drawing showing a circuit diagram of an embodiment of the invention.

Referring now to the drawing, an input terminal is provided to which these is applied a voltage which is designated as the input voltage. This is the voltage for which a second voltage is required which is inversely proportional thereto. The input voltage is applied through a resistor 12 to the cathode of a diode 14. This diode may be either the "dry" type such as selenium or germanium, or a vacuum tube diode which is enclosed in a vacuum envelope. The cathode of the diode 14 is connected through a condenser 16 to the grid 22 of an amplifier tube 18. The grid 22 of the tube is connected to ground through a resistance 26. The anode 20 of the amplifier is connected to B+ through one winding 32 of a three-winding transformer 30. The second winding 34 in this transformer is connected to the grid 44 of a tube 40 which is used in a blocking oscillator circuit. The third winding 36 of this transformer is connected in series with the anode 42 of the blocking oscillator tube 40 and a resistor 48 through which, in turn, operating potential from the B+ source is provided. The cathode 46 of the blocking oscillator tube is connected through a resistor 50 to ground. A condenser 52 is connected from this cathode to the junction of a resistor 54 and the second winding 34 of the three-winding transformer. This latter resistor 54 returns this second winding to ground. The blocking oscillator circuit as thus far described is typical and its operation is well known, and may be found more fully described in "Electron Tube Circuits," by Seely, published by McGraw-Hill Book Company, page 404.

The cathode 46 of the blocking oscillator is also connected through a resistor 56 to a condenser 58. The other end of the condenser is connected to ground. The junction of this latter condenser and the resistor serves as the output terminal 60 from which a voltage, reciprocally related to the input voltage, is obtained. The junction of the resistor 48 and third winding 36 of the transformer, which is in the plate circuit of the blocking oscillator, is connected through a condenser 62 to the anode of the input diode 14. Another diode 64 which functions as a clamping diode is connected from this diode to clamp the most negative portion of the sawtooth to ground. A condenser 66 is connected in the R-C circuit (48, 62, 66) for generating the sawtooth wave. The operation of the circuit is as follows:

The blocking oscillator generates a rectangular wave, but the resistor-condenser combination 48, 62, 66 in its anode circuit converts this rectangular wave to a sawtooth. This sawtooth wave is applied to the anode of the diode, 14, which is maintained substantially cut off by an applied input voltage, until the sawtooth exceeds the amplitude of the input voltage. When the diode goes conducting, its output is picked off and applied to the differentiating circuit formed by the condenser 16 and resistor 26. This produces a pulse which is amplified and injected into the blocking oscillator grid. The blocking oscillator frequency is determined by the frequency of the injected pips, which in turn is inversely proportional to the amplitude of the applied voltage. This may be seen by virtue of the fact that the higher the amplitude of the input voltage the later the occurrence of the conduction of the pick-off diode 14 and the lower the frequency of the pips being injected into the blocking oscillator. The lower amplitude of the input voltage, the sooner the occurrence of conduction by the pickoff diode and the more rapid the occurrence of pips being injected into the blocking pulse generator. The resistor 56 and condenser 58 connected to the output terminal 60 form an integrating network, and accordingly, the blocking oscillator output is given an average direct current value which is the quotient of the input voltage divided into unity. The absence of an input voltage will provide sawtooth waves at a frequency which is the natural frequency of the blocking oscillator. As soon as a voltage is applied to the input terminal, however, the frequency of the blocking oscillator will change in accordance with the amplitude of the input voltage and will assume a frequency which is inversely proportional to its amplitude.

Although a blocking oscillator is here described as the device required for generating square waves at a frequency responsive to an injected frequency, this should not be construed as a limitation upon the invention, since other forms of pulse generators are known which can satisfy such a requirement and still fall within the scope of the inventive concept.

There has been shown and described herein a simple, reliable and novel circuit for performing analog division. The circuitry shown has a further virtue in that it operates substantially independently of tube replacement or variations of tube characteristics.

What is claimed is:

1. A system for obtaining a voltage proportional to the reciprocal of an input voltage comprising a blocking oscillator having a frequency determined by the frequency of pulses applied thereto, means to derive two outputs from said blocking oscillator, means to convert a first of said outputs into sawooth pulses, means to which said sawtooth pulses and input voltage are applied to produce pulses having a frequency inversely proportional to the amplitude of said input voltage, means to apply said produced pulses to said blocking oscillator, and means to integrate the second of said outputs to provide a voltage proportional to the reciprocal of said input voltage.

2. A system for obtaining a voltage proportional to the reciprocal of an input voltage comprising means to generate pulses having a frequency responsive to the frequency of produced input pulses, means to produce sawtooth pulses in timed relation to said generated pulses, means to which said sawtooth pulses and input voltage are applied to produce pulses having a frequency inversely proportional to the amplitude of said input voltage, means to apply said produced pulses to said means to generate pulses to control the frequency thereof, and means to integrate said generated pulses to provide a voltage proportional to the reciprocal of said input voltage.

3. A system for obtaining a voltage proportional to the reciprocal of an input voltage comprising a rectifier, means to apply said input voltage to said one terminal of said rectifier, a differentiating circuit connected to said one rectifier terminal, a blocking oscillator, means to couple the output from said differentiating circuit to said blocking oscillator to control the frequency of operation, means to derive two outputs from said blocking oscillator, means to shape one of said blocking oscillator outputs into a sawtooth waveshape and to apply said sawtooth waveshape to the other terminal of said rectifier, and means to integrate the other of said blocking oscillator outputs whereby said integrated output is proportional to the reciprocal of said input voltage.

4. A system for obtaining a voltage proportional to the reciprocal of an input voltage comprising a rectifier, means to apply said input voltage to one terminal of said rectifier, a differentiating circuit connected to said one terminal of said rectifier, a blocking oscillator having an anode, grid and cathode circuit, means to inject output from said differentiating circuit into said grid circuit to control the frequency of said blocking oscillator responsive thereto, sawtooth wave shaping means connected between said anode and the other terminal of said rectifier, and an integrating network connected to said cathode circuit to provide a voltage output which is proportional to the reciprocal of said input voltage.

5. A system for obtaining signals having a frequency characteristic related to the amplitude of an applied voltage comprising means having an input and an output for generating sawtooth voltages at said output in response to signals applied to said input, said generating means including means responsive to said input signals for initiating the generation of said sawtooth voltages, a terminal for receiving said applied voltage, means coupled to said generating means output and to said terminal and responsive to a predetermined relationship of said sawtooth and said applied voltages for producing signals, and means for applying to said generating means input said signals produced by said last named responsive means to initiate the generation of said sawtooth voltages.

6. A system as recited in claim 5 wherein said means coupled to said generating means output and to said terminal includes diode means.

7. A circuit comprising means responsive to derived signals to generate pulses having a frequency in accordance with the frequency of said derived signals applied thereto, means responsive to said generated pulses to produce sawtooth voltages in timed relationship to said generated pulses, means to which said sawtooth voltages and an input voltage are applied and which is responsive to a predetermined relationship of the amplitudes of said sawtooth and said input voltages for deriving signals having a frequency related to the amplitude of said input voltage, and means to apply said derived signals to said means to generate pulses to initiate the generation of said pulses and to control the frequency thereof.

8. A circuit for obtaining a voltage proportional to the reciprocal of an input voltage comprising means to generate pulses having a frequency responsive to the frequency of derived signals applied thereto, means to produce sawtooth voltages in timed relationship to said generated pulses, means to which said sawtooth and said input voltages are applied and which is responsive to a predetermined relationship of said sawtooth and said input voltages for deriving signals having a frequency inversely proportional to the amplitude of said input voltage, means to apply said derived signals to said means to generate pulses to control the frequency thereof, and means to produce output signals that vary in accordance with the frequency of said derived signals.

9. A system for obtaining output signals having a characteristic proportional to the reciprocal of the amplitude of an applied voltage comprising means having an input and an output for generating sawtooth voltages at said output in response to signals applied to said input, a terminal for receiving said applied voltage, means coupled to said generating means output and to said terminal and responsive to said sawtooth voltages passing a voltage level substantially equal to said applied voltage for producing other signals having a frequency inversely proportional to the amplitude of said applied voltage, means for applying said other signals to said generating means input, and means for deriving output signals that vary in accordance with the frequency of said other signals.

10. A system as recited in claim 9 wherein said sawtooth generating means includes a resistor, a condenser, and an oscillator for controlling the charge and discharge of said condenser, said other signals being applied to said oscillator to control the frequency of oscillation thereof.

11. A system as recited in claim 9 wherein sawtooth generating means includes a resistor, a condenser, and an electron discharge device having a plurality of electrodes for controlling the charge and discharge of said condenser, said other signals being applied to an electrode of said electron discharge device, said means for deriving output signals being connected to an electrode of said electron discharge device.

References Cited in the file of this patent

UNITED STATES PATENTS 2,616,965 Hoeppner _______________ Nov. 4, 1952